(12) United States Patent
Riordan et al.

(10) Patent No.: US 6,528,750 B1
(45) Date of Patent: Mar. 4, 2003

(54) HEAT/PRESSURE FUSING WIRE TO TERMINAL APPARATUS AND METHOD

(75) Inventors: Edward D. Riordan, Somerville, NJ (US); Allan S. Warner, Clark, NJ (US)

(73) Assignee: Joyal Products, Inc., Linden, NJ (US)

( * ) Notice: Subject to any disclaimer, the term of this patent is extended or adjusted under 35 U.S.C. 154(b) by 0 days.

(21) Appl. No.: 09/732,847

(22) Filed: Dec. 8, 2000

(51) Int. Cl.⁷ .......................... B23K 11/16; B23K 11/10
(52) U.S. Cl. .................. 219/56.22; 219/91.21
(58) Field of Search ............... 219/56, 56.1, 56.21, 219/56.22, 91.21; 228/102, 4.5, 180.5, 8, 9, 227, 228, 229, 5.7

(56) References Cited

U.S. PATENT DOCUMENTS

| | | | | |
|---|---|---|---|---|
| 1,679,730 A | * | 8/1928 | MacDonald et al. | 219/119 |
| 2,967,228 A | * | 1/1961 | Tindall | 219/119 |
| 3,421,212 A | * | 1/1969 | Chabot | 219/53 |
| 4,079,225 A | * | 3/1978 | Warner | 219/110 |
| 4,465,913 A | * | 8/1984 | Stokoe et al. | 219/56.1 |
| 4,476,372 A | * | 10/1984 | Prucher | 219/119 |
| 4,650,948 A | * | 3/1987 | Riordan | 219/119 |
| 4,687,898 A | * | 8/1987 | Riordan et al. | 219/56.1 |
| 4,687,900 A | * | 8/1987 | Warner | 219/111 |
| 4,755,650 A | * | 7/1988 | Riordan | 219/56.22 |
| 4,835,356 A | * | 5/1989 | Abe | 219/119 |
| 4,849,596 A | * | 7/1989 | Riordan et al. | 219/56.1 |
| 5,057,661 A | * | 10/1991 | Banner | 219/121.69 |
| 5,153,404 A | * | 10/1992 | Riordan et al. | 219/56.1 |
| 5,264,674 A | * | 11/1993 | Mangan et al. | 219/56.22 |
| 5,300,753 A | * | 4/1994 | Rossi | 219/110 |
| 5,428,202 A | * | 6/1995 | Rossi | 219/110 |
| 5,660,742 A | * | 8/1997 | Warner et al. | 219/243 |
| 5,910,259 A | * | 6/1999 | Warner | 219/109 |
| 5,994,658 A | * | 11/1999 | Riordan et al. | 219/119 |
| 6,326,580 B1 | * | 12/2001 | Hiiro | 219/110 |

* cited by examiner

Primary Examiner—Tom Dunn
Assistant Examiner—Zidia Pittman
(74) Attorney, Agent, or Firm—Edward Dreyfus

(57) ABSTRACT

A method and apparatus of making an electrical bobbin including applying to the wire/terminal assembly fusing pressure and heat. Sensing the temperature of an electrode zone near one of its fusing surfaces, and controlling the application and cessation of fusing power in response to the zone temperature values. Power application can cycle on and off for a set time period, number of set cycles, or stopped in response to another event such as sensed electrode displacement reaching a set value. Various other control parameters are or can be employed. The electrodes are preferably high resistant material and no significant current flows between upper and lower electrodes.

29 Claims, 10 Drawing Sheets

HEAT/PRESSURE FUSING WIRE TO TERMINAL APPARATUS AND METHOD

BACKGROUND

The present invention generally relates to fusing wire terminations and more particularly to fusing wire windings to terminals on devices such as electrical bobbins.

Electrical bobbins have been used since the 1920's in a wide variety of applications. Typically, bobbins include a Bakelite or plastic cylindrical body usually defining a central, longitudinal bore. Fore and aft flanges give the body a spool shaped appearance. A pair of blade terminals are secured to the fore portion of the body on the fore flange or extensions of the fore flange and usually extend parallel to each other and either longitudinally forward of or transversely the body. These blades function as male terminals and removably insert into female receptacles as desired to make electrical contact therewith. In some bobbin designs the body end of each blade terminal typically forms a wing, arm, or stud extending laterally from the body. In others the terminals are molded into the flange itself. Still others include a U shaped plastic piece in which the legs of the U form the flanges and the central piece of the U runs parallel to the body axis and the terminals can be molded in the U central portion or extend from it if secured to some other part.

During bobbin manufacture, a winding machine winds an insulated wire a predetermined number of wire turns around the body mid-portion to form a coil. The coil is cut from the wire source so that the coil has two free distal ends. Each free wire end is conventionally welded or soldered to a respective blade terminal or stud extending from the terminal, thereby completing the electrical circuit from one blade terminal, through its stud, through the coil winding on the body, through the other stud and to other blade terminal.

Early bobbin making processes included soldering the distal winding ends to the studs. The soldering required pre-stripping the winding insulation and adding (melting) liquid solder to form the joint. However, in the 1940's, there was developed a welded joint that did not require solder or pre-stripping the insulation. See FIG. 10. This technique used two upper electrodes (a main electrode (E) and auxiliary electrode (A)) in contact with each other. The work (W) was placed on a low resistant lower electrode (LE). Application of power was placed across the two upper electrodes to heat the main electrode (E). The wire insulation (I) held open the current path to the lower electrode (LE) open until the main electrode (E) burned off the wire insulation (I) at which time current flowed from the upper main electrode through the metal wire/stud (MW/S) to be joined and through the lower electrode (LE). The high current through the work heated the wire/stud further to melt the same and amalgamate the metals together.

Although this conventional method saves soldering and wire stripping time and materials and can provide a cleaner joint than soldering, it suffers from arcing and lack of careful control, repeatability and consistency from bobbin to bobbin. Accordingly, its yield percentage is not optimized.

Recently, a new technique has been developed to obtain better control over the fusing parameters and quality of the joint from bobbin to bobbin. This technique uses high resistance electrodes and passed the current only through the upper and lower electrode to heat the same individually. No current passes through the work. See FIG. 9. More specifically, the electrode E1, E2 were mounted on the electrode holders H1, H2 of a fusing machine similar to that disclosed in U.S. Pat. No. 4,371,772 and employing the method disclosed therein, except the current paths (I) were established as shown in FIG. 9. The electrodes E1, E2 had slot or cut-outs (S) to concentrate the current and heat at the zones near the electrode fusing surfaces that engage bobbin blades (13) and wire (WI) wound thereon. The vertical arrow indicated motion of electrode E1 toward and away from electrode E2.

Although this new technique improved some of the control parameters, it was not free from technical problems. For example, the electrodes tended to overheat and introduce defects in the fused joints. If thereafter operators continued to fuse joints, the electrodes would actually melt and sometimes cause damage to other parts of the machine. Also, the design of the electrodes could not accommodate the placement of bobbin wings that were set longitudinally aligned with or aft of the forward bobbin flange.

SUMMARY OF EXAMPLARY EMBODIMENTS OF INVENTION

It is a primary object of the present invention to provide an apparatus and method for manufacturing devices, such as bobbins, in which the two wire terminations are formed simultaneously, with high quality and uniformity, and without the need to turn the work being so terminated. In addition, it is a primary object to effect such terminations with precise control of fusing electrode temperature at the fusing surface so that better control of the joint is achieved with an increase in manufacturing repeatability, reliability, quality and yields. Another primary object to prevent electrode overheating which may cause damage to the work and machine parts.

An exemplary embodiment according to the principles of the present invention includes using high resistance upper and lower fusing electrodes to provide great heat and high pressure to the wire/stud combination to burn-off the wire insulation, squeeze them under very high pressure, to form a mechanically fused or compression joint between each wire and stud. Fusing pressure and the electrode displacement during fusion is also be sensed and used in combination for various parameter control and quality checks.

As seen below, the electrodes are preferably shaped to concentrate the heat and pressure development precisely at the points of heat application to the contacted work. Advantageously, substantially no current passes through the small wire or from one electrode, through the wire to the other electrode. In addition, the upper electrode-contacting (pressure) surface is shaped to reduce strain between the compressed and uncompressed portion of the wire.

Also, the present invention provides much better control of the fusing process by first increasing pressure on the work and starting fusing power only when a predetermined pressure is reached. Power heats the electrodes to burn off insulation and soften but not melt the metal parts. An electrode zone immediately adjacent one of the fusing surfaces (preferably on the upper electrode) is monitored to control or pulse current to (i) control the fusing temperature for a period of time or until some other control parameter is reached and (ii) prevent electrode overheating. Time or the displacement of the electrode, which are still being pressed toward each other, can be used to determine cessation of the fusing power. This technique increases the yield, quality, and uniformity of the bobbin joints manufactured.

Both wire/stud sets on the bobbin can be fused simultaneously so that time is saved and turning fixtures and apparatus are not needed for a second fusing step on the same bobbin and the on-set and ceasing of fusing current can be precisely controlled relative to a predetermined electrode fusing surface temperature.

DRAWING DESCRIPTION

Other and further objects, benefits, and features of the present invention will become apparent with the following detailed description when taken in view of the appended drawings, in which.

DETAILED DESCRIPTION OF EXEMPLARY EMBODIMENT OF INVENTION

Figure 1:
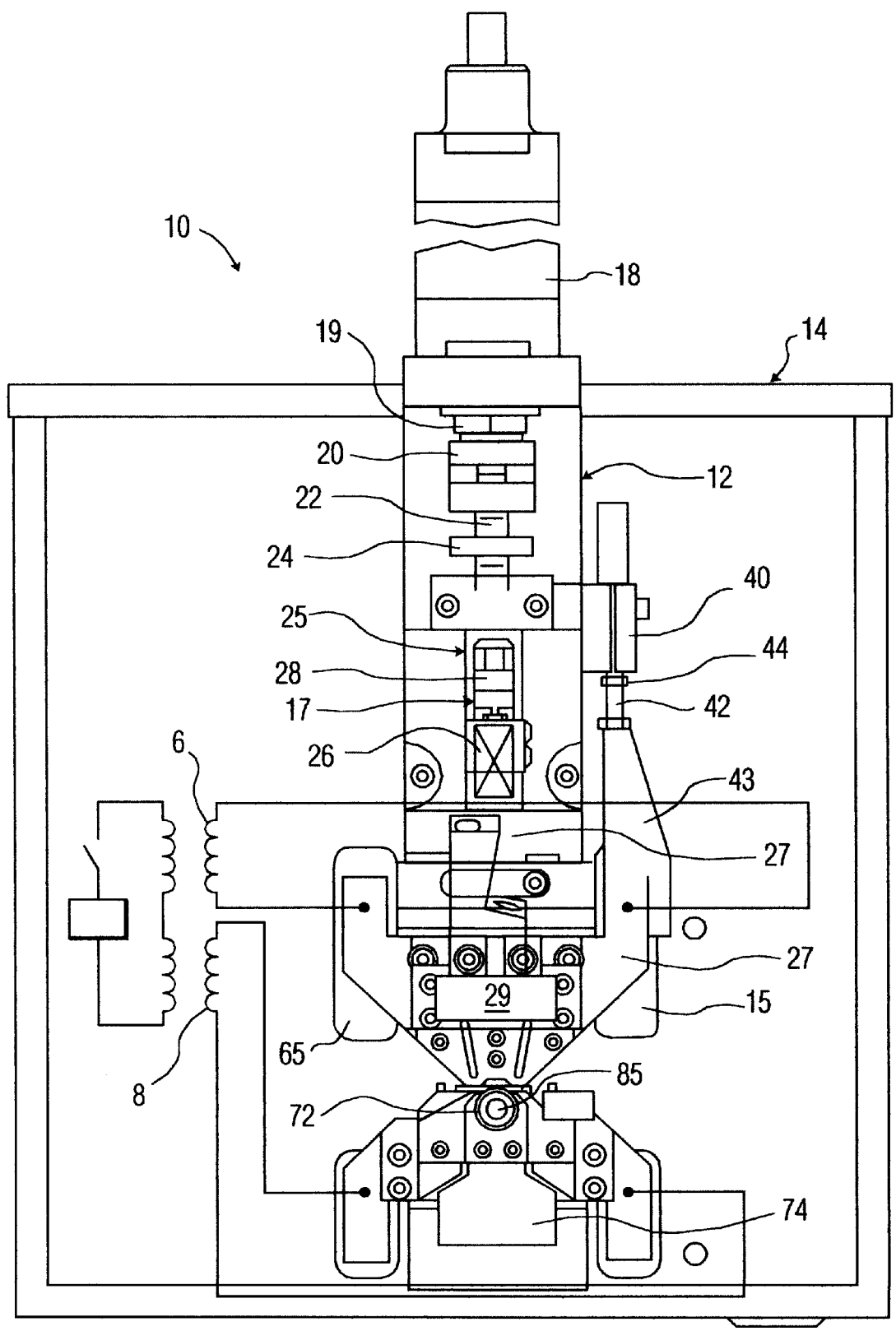
FIG. 1 is a front elevation view of one exemplary apparatus embodiment of the present invention.
Figure 2:
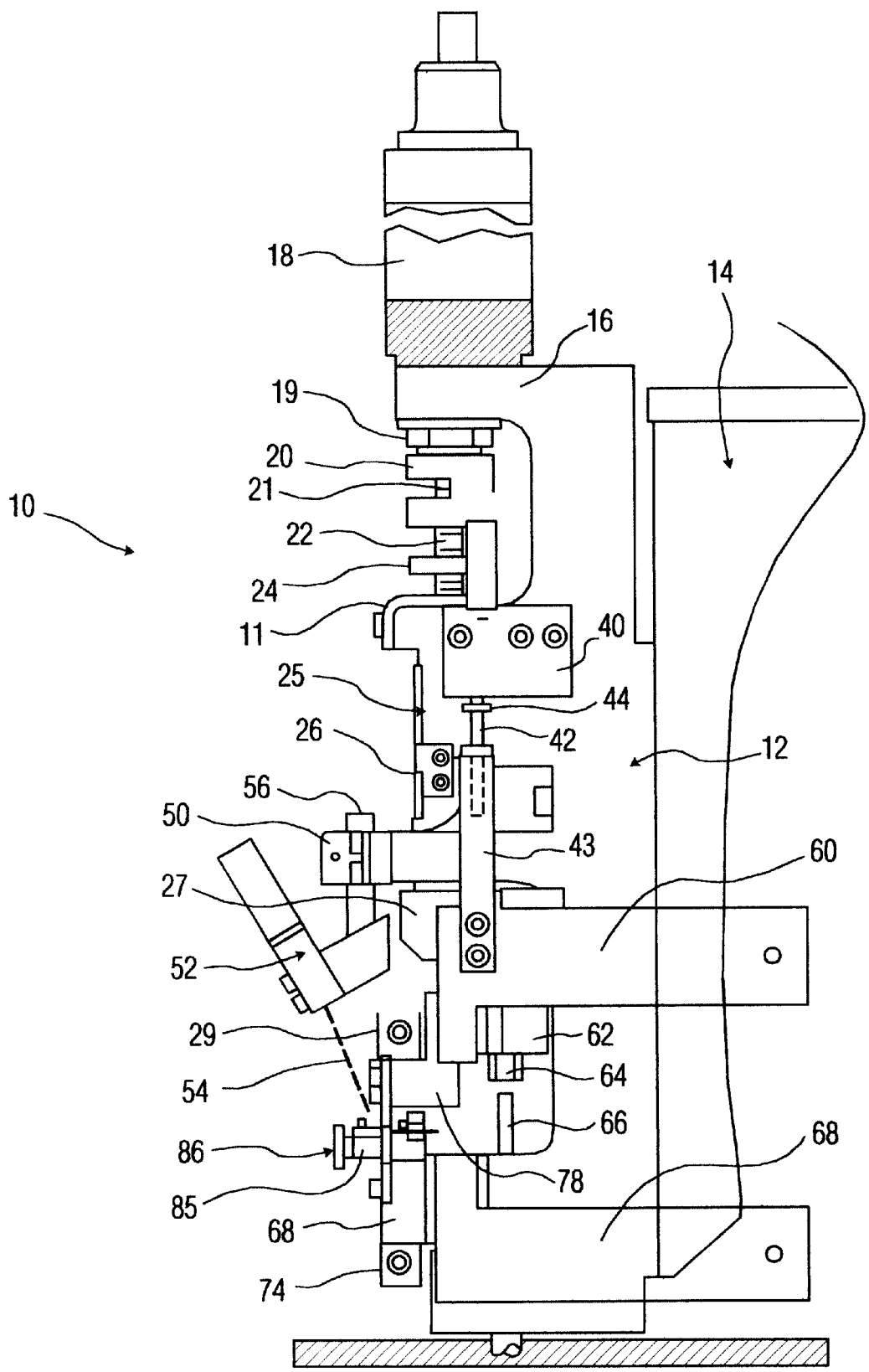
FIG. 2 is a side elevation view of the apparatus in FIG. 1.

One exemplary embodiment 10 of fusing machine according to the principles of the present invention is disclosed in FIGS. 1 and 2. Machine 10 includes a frame 12 having a cast support frame 16 for mounting air cylinder or a DC stepping motor 18, which is secured by lock nut 19. C-shaped bracket 20 has one leg secured to the shaft 21 of cylinder 18. Threaded shaft 22 has its upper end threaded to the bottom leg of C-bracket 20 and its lower end is slip fitted into main pressure shaft 25. Knurled thumbscrew 24 is threaded on to shaft 22 to rotate for setting a positive stop for downward movement of C-bracket 20 when screw 24 contacts the top of frame collar 11. Screw 24 therefore sets a precise pressure for spring 26 during fusing described below. A linear variable distance transducer (LVDT) 40 is mounted to the side of the cast support frame 16. LVDT 40 cooperates with adjustable stop 42 having its lower end mounted to frame 12 by arm 43 and its upper end vertically adjustable by turn nut 44.

Pressure shaft 25, preferably includes an open, hollow upper portion and a closed lower portion. Initially, shaft rests on adjustable screw 28 that sets load cell 17 that, in turn, rests on pressure spring 26 that rests on the inner bottom of shaft 25. Spring 26 functions to increase pressure on the work below as it is compressed by the downward thrust from cylinder 18 and intermediate parts and to continues to apply pressure after stop screw 24 engages frame collar 11 of frame 12. As described below, spring 26 continues to apply fusing pressure and electrode displacement on the heated work after screw 25 reaches the predetermined fixed position against frame collar 11. Spring 26 lower end contacts the inner bottom (upper end of solid bottom portion) of the pressure shaft 25 that connects to the upper end of the upper electrode holder 27. Water-cooled chill block 29 mounts to holder 27 and functions as a heat sink as described below.

Thermal monitor 52 mounts to frame 12 via bracket 50 with vertical adjustment screw 56. Monitor 52 is precisely aligned on, preferably, one of the upper electrode heating zones contiguous to a fusing surface to sense the temperature thereof before and during fusing operation. See U.S. Pat. Nos. 4,079,225, 4,224,496, and 4,293,805 for further details of light sensing temperature-controlling system suitable for use herein. It is preferred that the monitor 52 subassembly include a red laser alignment beam for rapid and precise alignment of the sensor and lens axis directly on the electrode zone to be monitored. Alternately, thermal monitor can mount to and move with the upper electrode holder so that the upper electrode temperature can be monitored at all times and not only when the electrode is in the fusing position. One example is to mount monitor 52 to chill block 29 described below. This alternate arrangement is represented by the dashed line from bracket 50 to block 72.

The aft end 62 of the upper electrode holder 27 also includes a permanent non-adjustable stop nut 64 threaded into end 62. Nut 64 contacts vertically adjustable stop post 66 threaded to the bottom of frame 12 for vertical adjustment. Stop 66 and nut 64 function to assure that fused small wires are not unduly crushed during fusing. If desired, an insulated wire (not shown) can be run to nut 64 lower surface so that this assembly functions as a touch switch to indicate when downward movement of the upper electrode reaches a predetermined displacement. It is advantageous to employ this function when bobbin terminal wires are hand wrapped or with such wires having diameters below 0.005 inch. If during fusing the upper electrode does not displace far enough, touch switch will not close and the controller will not enable the next fusing operation or it can give a visual or audible signal to alert the operator or system to check the quality of the last joint. This enables the operator to re-set or re-calibrate the machine if necessary.

Lower electrode holder 68, in this exemplary embodiment, mounts permanently to frame 12. Water-cooled chill block 70 mounts to the lower parts of holder 68. The water tubes to blocks 29 and 70 are not shown. Holder 68 is also designed to secure the lower electrode and the work (e.g., bobbin) to be fused. It will be understood that a great variety of bobbin designs exist and will exist in the future. Although only one design is disclosed here, it will be understood that the lower and upper electrodes and electrode holders of the present invention can be designed to accommodate the shape of the particular bobbin design selected without departing from the spirit and scope of the present invention.

Figure 3:
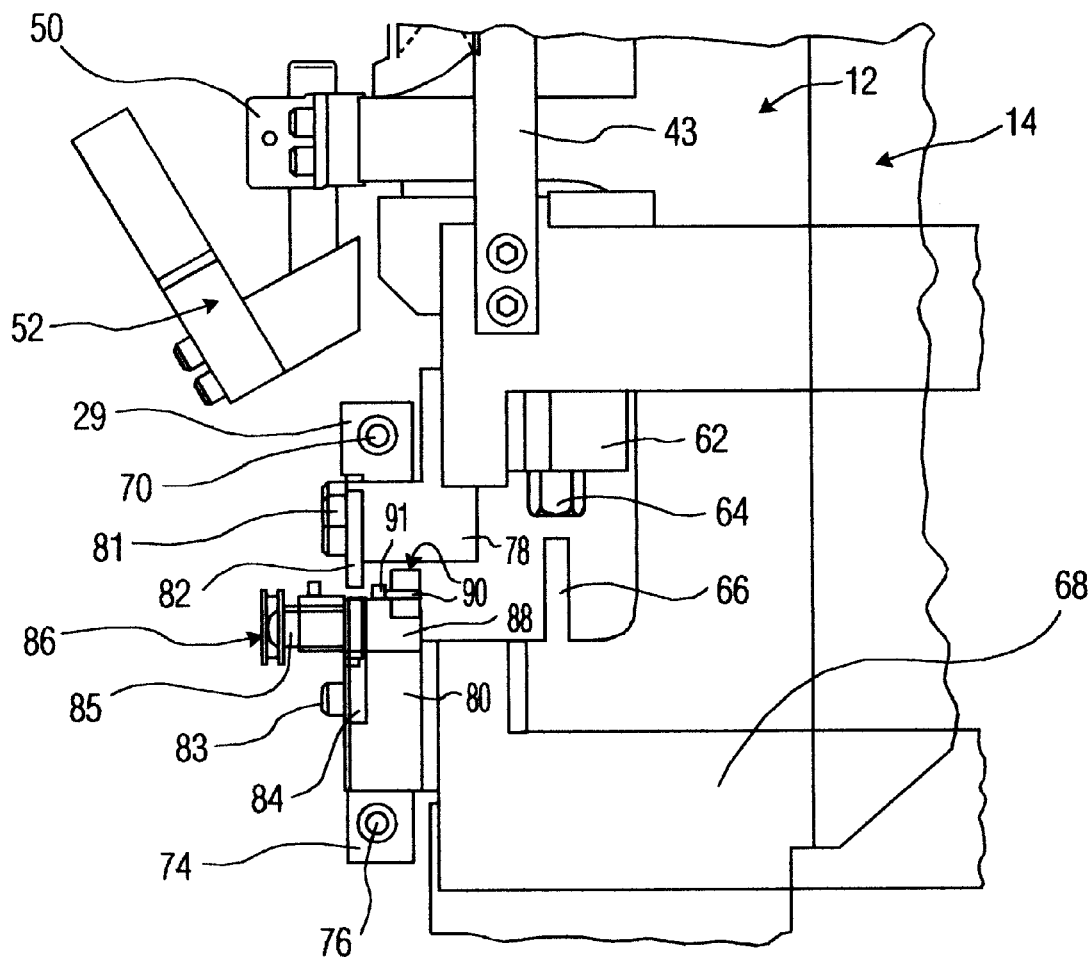
FIG. 3 is an enlarged potion of FIG. 2.

In the example of FIGS. 1–3 bolts 81 secures upper electrode 82 to holder 78 and bolts 83 secure lower electrode 84 to holder 80. Bolt 90 secures bobbin holder 88 to lower electrode holder 80 and guide plate 91 for bobbin main blades 98 and 100. See FIG. 4. Guide plate 91 includes a pair of female slots into which bobbin 86 main blades 98 and 100 fit during fusing. Holder 88 also include mounting shaft 85 about which the bobbin core fits. Thus, holder 88 functions to secure bobbin 86 in a precise fusing position relative electrodes 82, 84.

It will be understood that many types of bobbin designs can be terminated by the apparatus and method of the present invention. One example of bobbin 86, shown in FIG. 4, includes a body 90, hollow plastic cylinder or alternately other-shaped core 92, a rear flange 94, a forward flange 96, a metal left main blade terminal 98 and metal right main blade terminal 100. Each metal or metal alloy blade 98, 100 is L-shaped and includes an integral metal stud or wing 102, 104, respectively, extending laterally from, in this case, the aft end of the blade. Blades 98 and 100 are molded securely at their intersection with studs 102, 104 by integral plastic mounting part 105 of flange 96. Suitable insulated wire 108, such as magnet wire, can be conventionally wound tightly around core 92 by a conventional winding machine (not shown). Before fusing, as described above, wire 108 has two free distal ends 110 and 112. If desired, mount 105 can define a small post 106 about which one portion of the wire end 110 is wound to align the distal wire end along the top of stud 102. Thus, one or both wire ends 110 and 112 can be wrapped around stud 106 near the base thereof and extend along the upper stud surface as shown. Ends 110 and 112 then lie along studs 102, 104 top surfaces and preferably have their free ends tucked under the V-shaped tips of studs 102, 104 to hold this orientation before fusing. With bobbin 86 in this condition, the work is ready for insertion into fusing machine 10 and ready for the termination process.

As better seen in FIG. 3, the hollow cylinder or core 92 inserts on alignment shaft 85 and blades 98, 100 simply insert into female slots or suitable space in alignment plate 91 until the forward face of bobbin 86 contacts a stop (not shown) on shaft 85 or blades 98, 100 contact a stop in holder 88. It is important to space the bobbin plastic material from the electrode to prevent heat damage to the bobbin flange. This insertion and stop assures that the studs or wings 102, 104 are precisely indexed between the work contacting fusing surfaces of electrodes 82, 84 described below.

Machine 10 is releasably fitted with upper electrode 120 and lower electrode 122 held respectively to holders 78 and 68 by bolts generally as shown. Both electrodes are made of high resistance, compression metal such as tungsten. The preferred material is an alloy composed of:

2.1% Nickel-0.9% Iron and the balance tungsten.

Figure 5A:
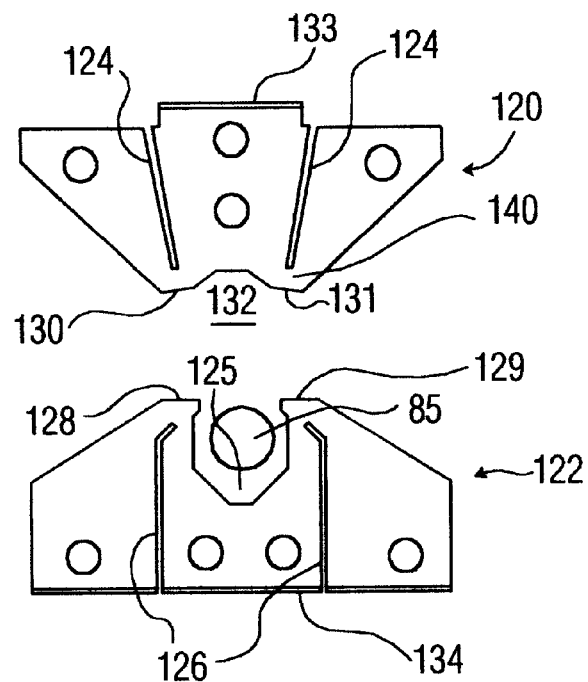
FIG. 5A is a front view of upper and lower electrodes that can be used to fuses the terminations of bobbins shown in FIG. 4 as well as part 85.
Figure 5B:
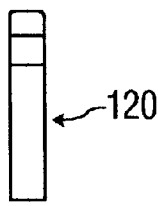
FIG. 5B is a side view of FIG. 5A.
Figure 5B:
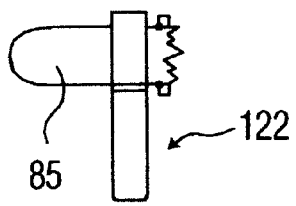

Electrodes must be designed to accommodate the design of the wings or studs of the bobbins to be terminated. For best results, the electrodes should be designed to localize the pressure and heat at the wire/stud interface while at the same time avoiding crushing the wire to such a degree that it is severed or lacks strength to provide strain relief. In this example, see FIGS. 5A and 5B, lower and upper electrodes 120, 122, respectively, each have three sections separated by slots 124, 126, which aid in concentrating the current and heat in the fusing surfaces. Lower electrode 122 includes cut out 125 to accommodate alignment shaft 85. Electrode 122 includes two fusing surfaces 128, 129 dimensioned to fit beneath studs 102 and 104. Upper electrode 120 includes two fusing surfaces 130, 131 dimensioned to lie just above studs 102 and 104. Surfaces 130, 131 are angled downward and outward from the bobbin axis so that wire ends 110 and 112 have progressively less pressure or displacement applied to the portions closer to the bobbin axis than away from this axis. This surface shape assures that the wire, after joining will have greater thickness and strength toward the coil for strain relief purposes. Electrode 120 center section includes a cut-out 132 to concentrate the heat and current flow near surfaces 130, 131 and a raised area 133 that contacts water cooling block 29. The outer sections of electrode 120 are secured by bolts to the water-cooled electrode holder 78, which in turn is water-cooled. Similarly, for electrode 122, center section 134 contacts cooling block 74 and the outer sections of electrode 122 contact cooling blocks of the lower electrode holder.

Prior to the manufacturing run terminating a number of bobbins, machine 10 is calibrated by adjusting thumb wheel stop 24 to obtain a desired spring force of spring 26 for load cell firing, obtain a desired permanent stop position with frame post 66, align the thermal monitor 52 to sense one of the zones, e.g., 140 near surface 130 or 131, and set the LVTD 40 for zero at time of applying power. See U.S. Pat. Nos. 4,510,370, 5,264,674, and 4,249,068 and the above mentioned patents for further details on setting and using these and associated techniques and apparatus.

Figure 4:
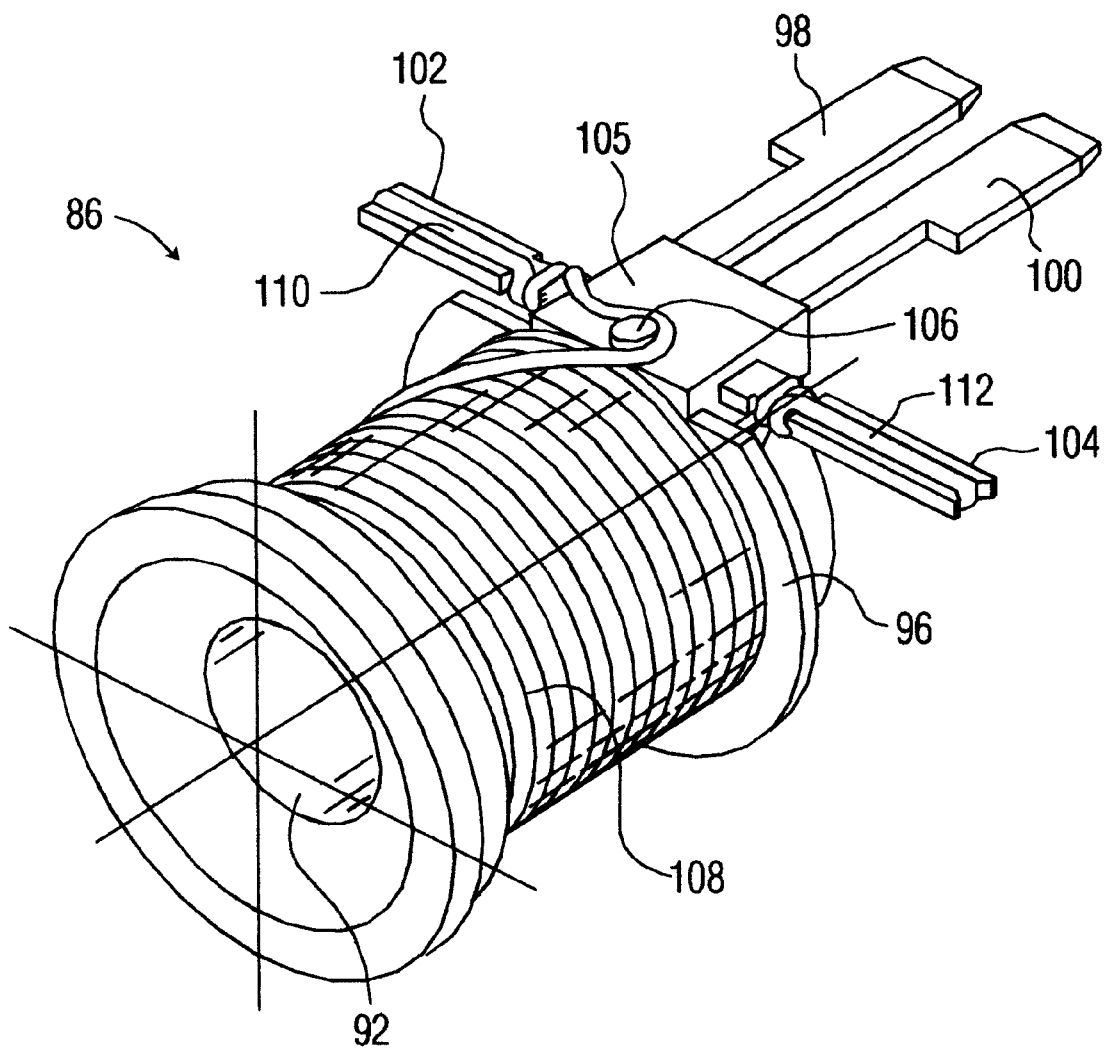
FIG. 4 is a perspective view of a typical bobbin that can be fused by the apparatus of FIG. 1 and in accordance with the present inventive method.
Figure 6:
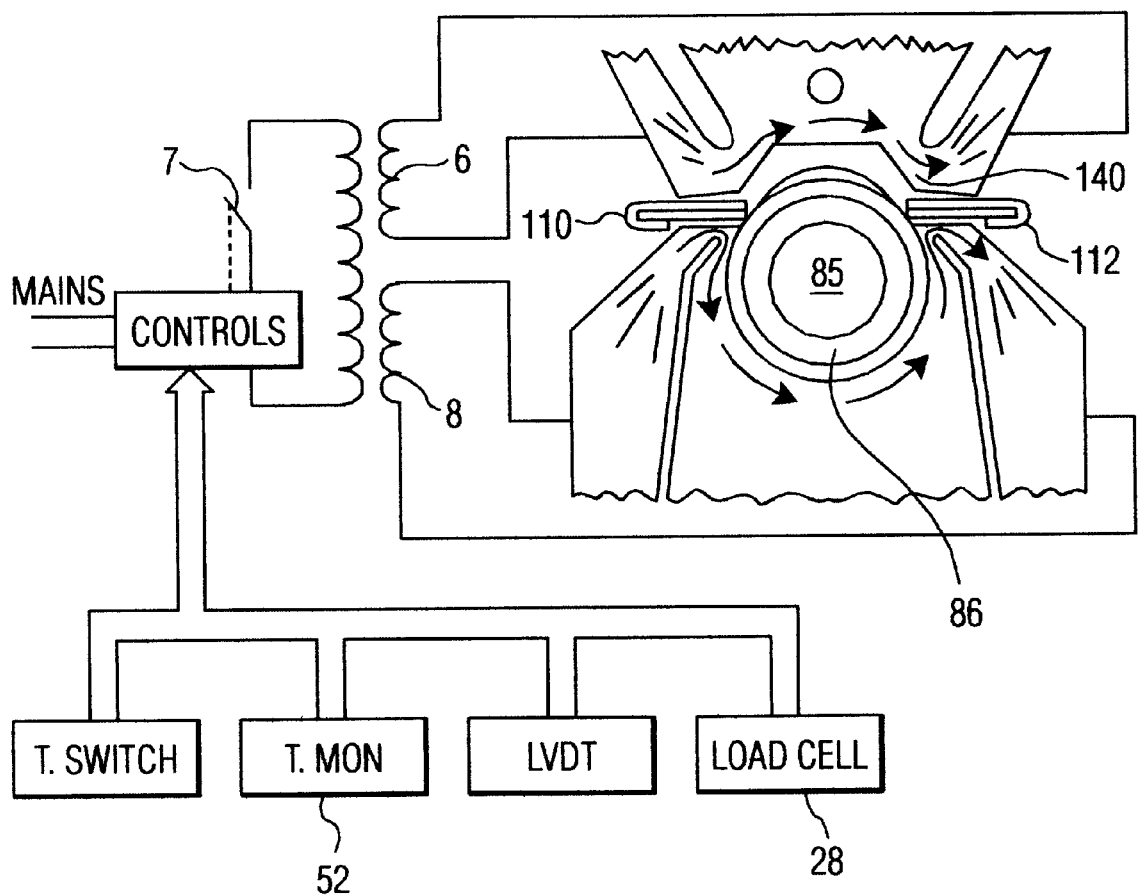
FIG. 6 is a partial exploded view of the upper and lower electrodes and the work that can be used to fuse the terminations of the bobbins in FIG. 4 and a schematic view of various parameter control circuits and devices.

The operation of machine 10 and the method will not be described. Core 92 of bobbin 86 as shown in FIGS. 4 and 6 is inserted onto shaft 85 and translated forward so that main blades 100, 104 slide into positioning plate 91. Bobbin 86 is moved forward until flange or blades contact a stop on holder 88 or plate 91. This positions studs or wings 102, 104 precisely between electrode surfaces 130, 131 and 128, 129, respectively and properly indexes the upper electrode relative to thermal monitor aligned to sense the zone just before surface 131.

The operator can now initiate the fusing operation by hitting or throwing a control switch, not shown, which applies power to cylinder or DC stepping motor 18 which drives holder 78 downward so that electrode surfaces 130, 131 contact the insulated wire ends 110, 112. Studs 102, 104 are in turn pressed against surfaces 128, 129. This state is considered Time Zero in FIG. 7. As cylinder 18 continues to drive holder 78 downward, pressure builds on wire ends 110, 112 and studs below, electrode 120 downward displacement decreases thus creating a greater back force at the bottom of spring 26. Thus, spring 26 begins to compress. Since the fusing pressure is applied through load cell 28, the load cell reading is indicative of the pressure applied to the stud/wire assemblies and surfaces 130, 131 and 128, 129. See load cell from $T_0$ to $T_1$.

So far in the process, no current has been applied through either electrode and no heat has been applied to the wire/stud assemblies other than insignificant heat resulting from high pressure.

Figure 7:
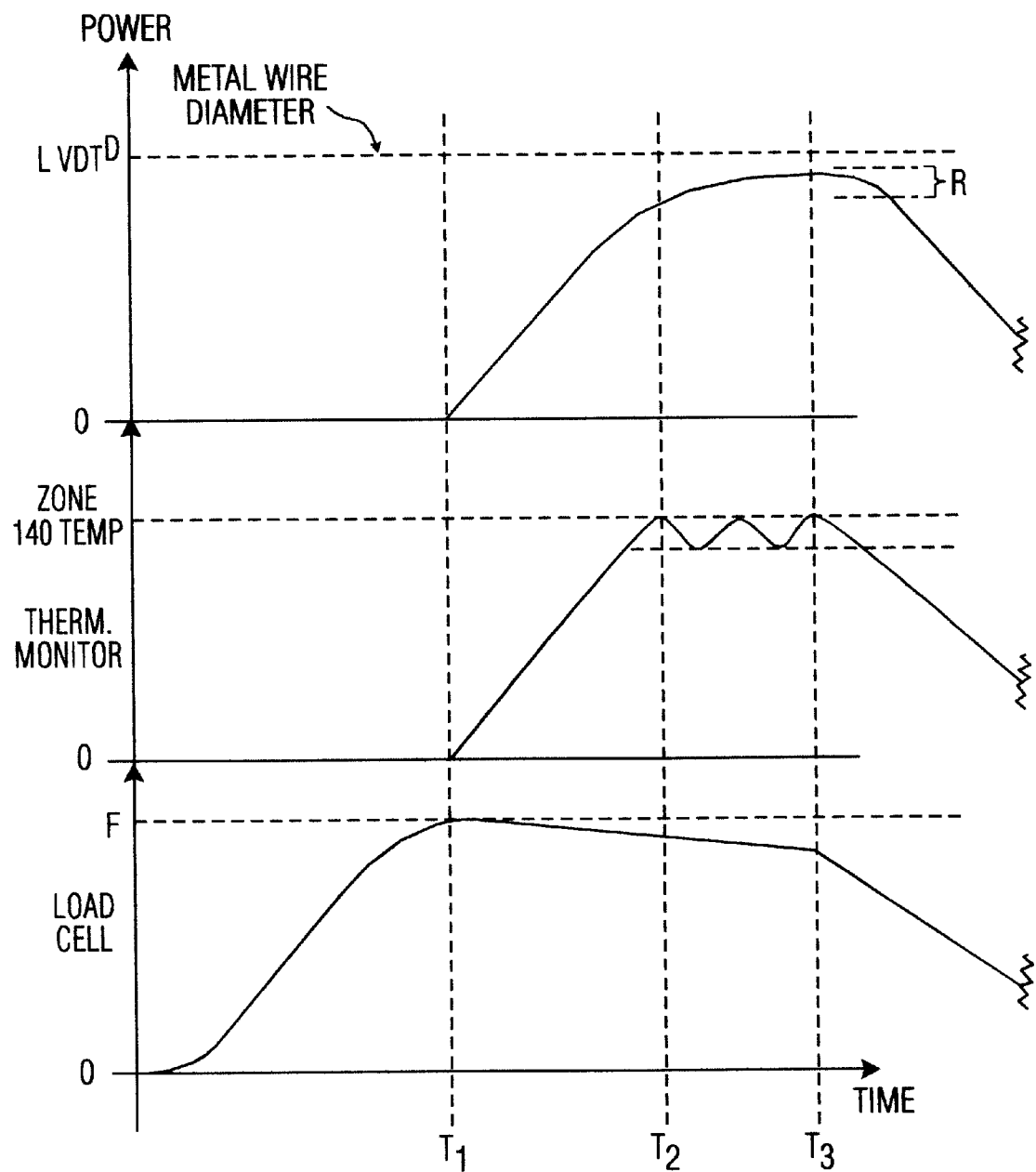
FIG. 7 is one example of a conceptual [time-fusing pressure] curve that can be employed by the apparatus and method of FIG. 1.

As seen in FIG. 7, the fusing power (current) can be applied in response to the load cell sensing a predetermined high pressure on the work to be fused. Thus, the load cell force rises as spring 26 is compressed. Fusing control settings can be set so that when load cell 28 senses a predetermined force or pressure (FIG. 7; $F_1$ at $T_1$) the controller closes switch 7 (FIG. 6) and applies fusing current to the upper and lower electrodes. As seen in FIG. 6, fusing current does not pass through the wire/stud assembly but instead current from each secondary 6, 8 passes through one outer section of electrodes 120, 122 through the small zones near fusing surfaces 130, 128, the center sections around cut-outs 125, 132, the small zones near fusing surfaces 131, 129, then through the other outer sections of electrodes 120, 122. This current creates great heat energy precisely at the small zones near the fusing surfaces 130, 131, 128, 129. This heat energy burns off the insulation of wire ends 110, 112 and heats the metal parts being squeezed between surfaces 130, 128 and 131, 129.

At the same time thermal monitor 52 senses the temperature of at least one of the zones 140 near surface 130 or 131. When monitor 52 senses that this zone has reached a predetermined temperature (such as 1000 degrees F.) pre-set in the controller ($T_2$ in FIG. 7), the controller can, in response, open switch 7 to stop the application of fusing power.

Further, the controller can be set to (i) keep the power switch 7 open, in which case the temperature will drop rapidly, (ii) close the power switch when the sensed temperature drops to, for example, 975° F., and (iii) repeat the sequence which causes the sensed temperature to oscillate or shift between 1000 and 975° F. for an extended or predetermined time period or until some other event is sensed such as a predetermined displacement sensed by the LVDT or satisfactory displacement indicated by close the touch switch. See zone 140 upper curve between $T_2$ and $T_3$. In this way, the process and machine assures that the electrodes cannot overheat even if they start the process with residual heat from a previous bobbin termination. Note, during $T_1$–$T_2$, the LVDT senses the vertical displacement of the upper electrode as it burns of the insulation, softens the wire metal, and squeezes or flattens the wire/stud assembly. As the displacement rises toward the metal wire diameter, compression spring maintains fusing pressure on the upper electrode but opens to reduce pressure slightly but maintain contact as the electrode 120 lowers after $T_1$. The controller can be set to stop the cyclical application of power when the LVDT senses a pre-set LVDT displacement designated at $T_3$ in FIG. 7. Electrode zones 140 temperature then drop off rapidly and the upper electrode is withdrawn by cylinder 18. The controller can also be set to assure the LVDT greatest reading reaches a predetermined range R (FIG. 7). If it did not, then the controller gives a "fault" reading or visual or audible alarm to alert the operator that the last joint is somehow out of range. Also, the controller logic can time the span between $T_2$ and $T_3$, and if the LVDT fails to reach the preset displacement within a predetermined time $T_3$ minus $T_2$, then the controller can remove power, shut down the system and give the appropriate fault indication. This is important because on occasion foreign objects or contaminants inadvertently position on the joint to be fused or between the electrodes which prevents the upper electrode from fully reaching the predetermined displacement. The fault override by the thermal monitor timing out prevents damage to the machine parts and a waste of time, power, and perhaps the bobbin itself.

Importantly, the amount of current and heat applied should be insufficient to melt or amalgamate the wire and stud parts together. Instead, these parts are heated to their plastic state such that the great pressure on them creates a mechanical fusion joint where hot microscopic parts are driven together to form a mechanical joint or mechanical bond. Accordingly, when heat is applied, the wire insulation vaporizes and the wire end, depending on its material, the stud soften. Electrode 120 is driven slightly further downward by compressed spring 26. It is preferred to measure the distance moved by electrode 120 after fusing current is applied. Accordingly, LVDT senses the displacement, see FIG. 7, from the time of current application $T_1$ to $T_2$, and beyond. The range indicated in FIG. 7 would be a predetermined acceptable range for initial metal wire diameter D. If the LVDT indicates an out-of-range reading, the bobbin should be examined for quality of the termination and possibly re-setting the machine.

Figure 8A:
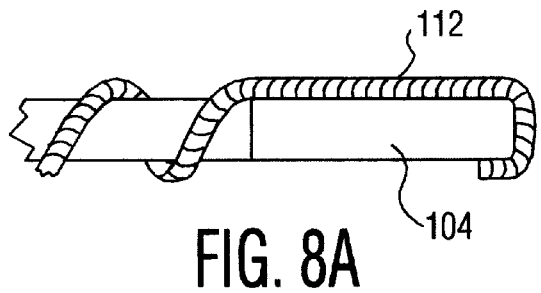
FIG. 8A is a partial perspective view of the wire/wing combination prior to fusing.
Figure 8B:
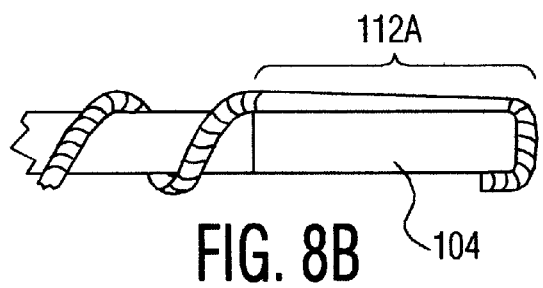
FIG. 8B is similar to FIG. 8A but after fusing.

With reference to FIGS. 8A and 8B it can be seen that insulated wire 112 has been heated to burn of insulation at 112A and squeezed to form a compression joint with stud 104. Because of the shape of electrode surface 131, wire sections 112A has greater thickness and strength toward the coil end than at the distal end of section 112A. Preferably, the reduction in section 112A thickness is gradual toward the distal end to avoid abrupt changes in thickness of this thin wire section and to better maintain the strength integrity of the section. The portion of wire at the extreme distal end of 112A is insignificant and can remain or be removed as flashing as desired.

Although the example embodiment disclosed in details herein includes terminals with 180° facing wings, the invention is not so limited and also applies to terminals with parallel wings or with no wings at all. In this latter case the wire end is simply wrapped around and fused to the aft end portion of the terminal. See FIGS. 11 and 12.

It will be understood that various modifications and improvements can be made to the herein disclosed exemplary embodiments without departing from-the spirit and scope of the present invention. All above-mentioned U.S. patents are incorporated herein by reference. The drawings and graphs herein are not drawn to scale.

Figure 13:
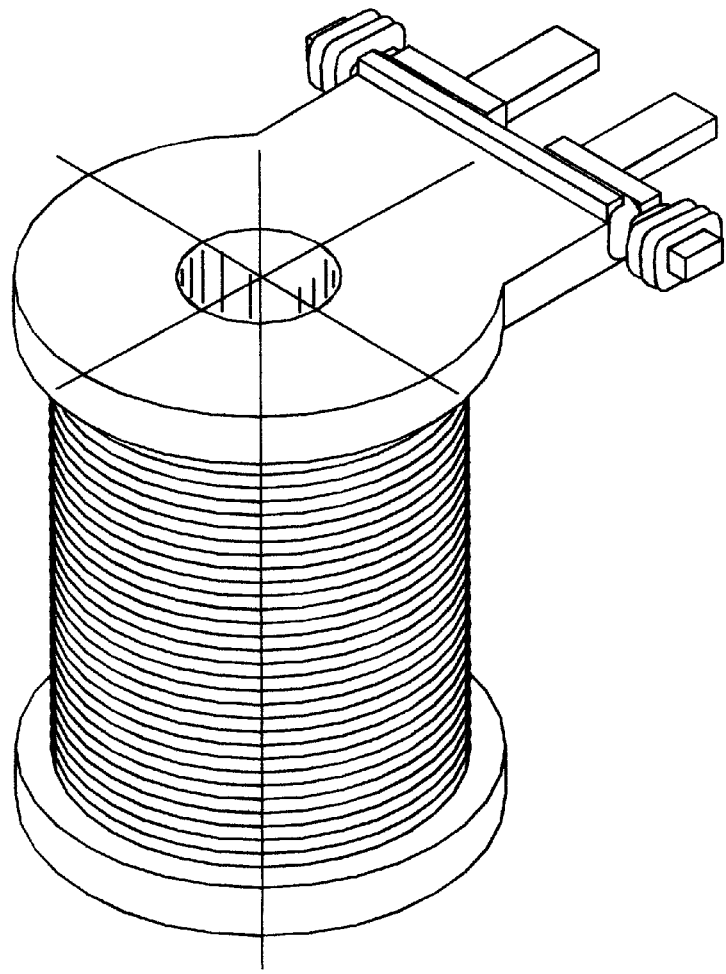
FIG. 13 is similar to FIG. 11 showing another configuration of terminal and wire assembly before fusing according to the present invention.
Figure 9A:
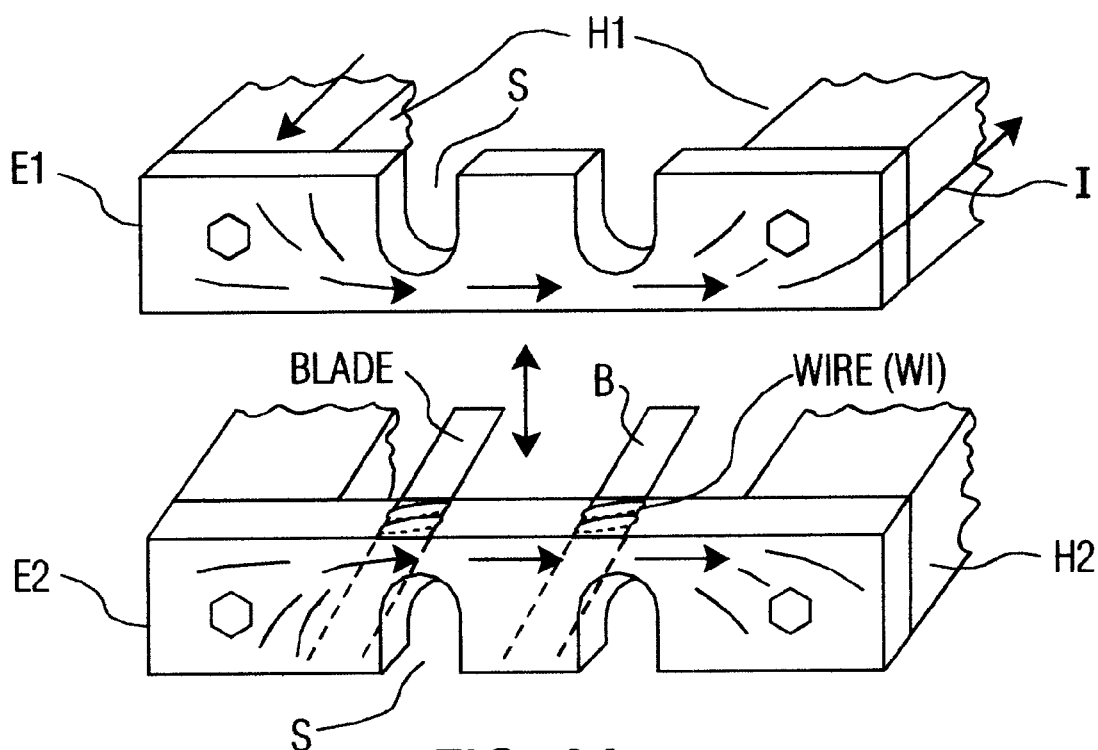
FIG. 9A is a partial perspective view of a prior art system.
Figure 9B:
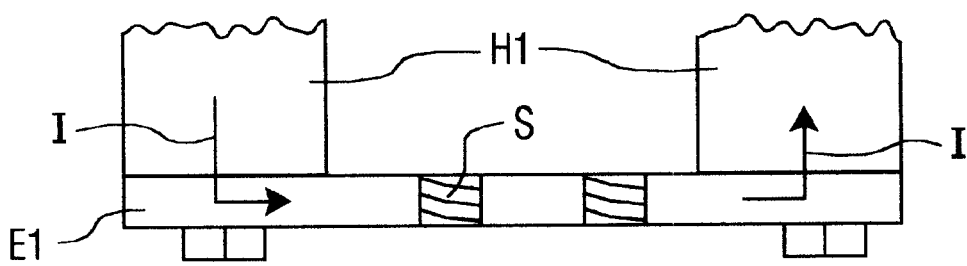
FIG. 9B is a top view of FIG. 9A.
Figure 10:
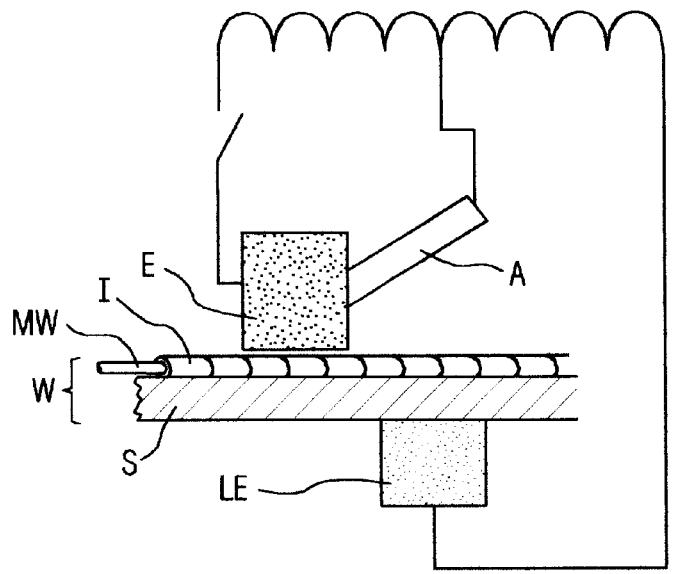
FIG. 10 is a pictorial and schematic view of a prior art system.
Figure 11:
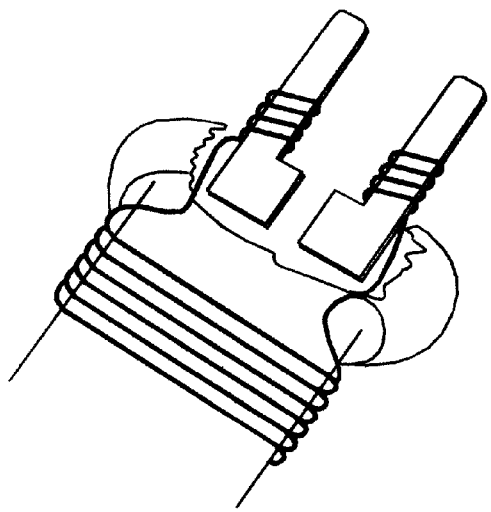
FIG. 11 is a partial perspective view with parts broken away of an alternate bobbin that can be fused by the apparatus and method according to the present invention.
Figure 12:
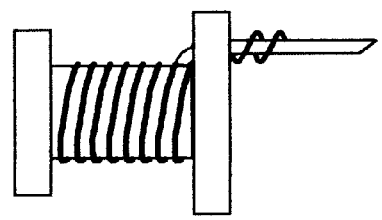
FIG. 12 is a side view of FIG. 11.

FIG. 13 is similar to FIG. 11 showing another configuration of terminal and wire assembly before fusing according to the present invention.

Another form of bobbin wing or stud and wire assembly is shown before fusing. In this case, the insulated wire end is wrapped around the terminal portion prior to fusing with the apparatus and by the method as generally disclosed herein.

What is claimed is:

1. Apparatus for fusing an insulated wire to a metal terminal comprising
    a frame,
    an upper fusing electrode mounted on said frame and comprising a first fusing surface,
    a lower fusing electrode mounted on said frame and comprising a second fusing surface,
    moving means for moving at least one of said upper and lower electrodes relatively toward each other so that, when the terminal and insulated wire are placed between said first and second fusing surfaces, said surfaces apply increasing fusing pressure to the terminal and wire,
    power means for heating said surfaces to a fusing temperature by applying current through each of said electrodes along current paths generally along the direction of each of the fusing surfaces to substantially avoid current flow through the terminal and wire even during fusing thereof, and
    control means for sensing the temperature of an electrode zone near said first or second fusing surface and controlling the power means to vary the amount of said current over time through at least one of said electrodes in response to the temperature of said zone.

2. An apparatus according to claim 1, further including
    said control including second means for sensing the pressure or force placed on the terminal and wire by said first and second surfaces and for initiating said power means to apply current to said electrodes in response to the sensed pressure or force reaching a predetermined fusing pressure or force.

3. An apparatus according to claim 2, wherein
said power means after initiation applies current to said electrodes to heat said surfaces to burn off the wire insulation and software but not melt the wire.

4. An apparatus according to claim 3, wherein
after the wire is softened, said moving means moves said electrodes relatively toward each other to further squeeze the wire and terminal together to form a mechanical compression joint.

5. An apparatus according to claim 1, wherein
the wire has a longitudinal length with one portion nearer a distal end and a second portion further from the distal end, and
one of said surfaces for engaging said wire being shaped to reduce the thickness of the wire one portion a greater amount than the wire second portion.

6. An apparatus according to claim 5, wherein
said one of said surfaces is shaped to gradually reduce the wire thickness from the second portion to the one portion.

7. An apparatus according to claim 1, wherein
said upper electrode includes a third fusing surface aligned with but spaced from said first fusing surface,
said lower electrode includes a fourth fusing surface aligned with but spaced from said second fusing surface,
said upper electrode having a first center portion defining a first cut-out between said first and third surfaces to concentrate the current flow and heat generation near said first and third surfaces,
said lower electrode having a second center portion defining a second cut-out between said second and fourth surfaces to concentrate the current flow and heat generation near said second and fourth surfaces.

8. An apparatus according to claim 7, wherein
said first and second center portions are mounted to cooling blocks for cooling said center portions.

9. An apparatus according to claim 1, wherein
said upper electrode includes a third fusing surface aligned with but spaced from said first fusing surface,
said lower electrode includes a fourth fusing surface aligned with but spaced from said second fusing surface,
said upper and lower electrodes including slots for concentrating current flow and heat generation near said fusing surfaces.

10. An apparatus according to claim 1, wherein
said control means stops the power means from applying current in response to the zone temperature reaching a predetermined fusing value.

11. An apparatus according to claim 10, wherein
said control means re-starts said power means to re-apply current flow in response to said zone temperature dropping to a predetermined value.

12. An apparatus according to claim 11, wherein
said control means again stops the power means from applying current in response to said zone temperature rising to a predetermined value.

13. An apparatus according to claim 12, wherein
said control means repeats the control of said power means for the application and cessation of current in response to the zone temperature rising to and falling to predetermined values,
the repeating cycle continuing for a predetermined number of cycles or a predetermined time period,
or upon said control means sensing the occurrence of another predetermined event.

14. An apparatus according to claim 1, further
comprising indexing means mounted to said frame for supporting each insulated wire and terminal in a precise position between said fusing surfaces.

15. An apparatus according to claim 7, further
comprising indexing means mounted to said frame for supporting each insulated wire and terminal in a precise position between said fusing surfaces,
and wherein at least a portion of said indexing means extends through one of said cut-outs.

16. An apparatus according to claim 1, wherein
said control means including third means for sensing the displacement of the relative movement of said electrodes after said power means first applies current to said electrodes and controlling said power means to permanently stop the application of current in response to sensing when such displacement reaches a predetermined value.

17. An apparatus according to claim 1, wherein
said third means for sensing the displacement of the relative movement of said electrodes after said power means first applies current to said electrodes
and for activating a fault indication or alarm in response to sensing that the maximum of such displacement failed to lie within a predetermined range of predetermined acceptable displacements.

18. A method of making an electrical bobbin having a body, an insulated winding wound around said body and having two insulated initially free wire ends, a pair of spaced metal terminals each of which includes a terminal portion to be joined to respective ones of said wire ends, each said wire end engaging the respective one of the terminal portions, the method comprising:
simultaneously applying rising pressure to each respective wire end and terminal portion assembly,
simultaneously applying heat energy to each said assembly after the on-set of said applying pressure to remove or burn off the insulation of said wire ends and to soften at least the wire metal to its plastic state without melting either the wire metal or terminal metal,
said applying heat energy includes engaging said assemblies between an upper high resistance electrode and a lower high resistance electrode and passing current through said upper electrode to heat the same and passing current through said lower electrode to heat the same without passing substantially current through the assemblies even after the wire insulation is removed or burned off,
sensing a parameter indicative of the amount of heat energy being applied to at least one of the assemblies, and
controlling the cessation of the application of heat energy in response to sensing at least one occurrence of the parameter reaching a predetermined value.

19. A method according to claim 18, wherein
the upper electrode and lower electrode each have a fusing surface, and one of said upper and lower electrodes have a zone contiguous to its fusing surface, and
said sensing step includes sensing a parameter indicative of temperature of said zone.

20. A method according to claim 18, wherein
said applying heat energy step includes controlling the application and cessation of heat energy in response to the parameter rising to and falling to predetermined values a predetermined number of times or during a predetermined time period, or before a predetermined subsequent event.

21. A method according to claim 20, wherein said applying high fusing pressure step continues during said applying heat energy step to reduce the diameter of the metal wire of the respective assemblies and form a fusion joint between the reduced metal wire and the respective terminal portion.

22. A method according to claim 21, sensing a parameter indicative of the displacement by which the assembly is reduced, and wherein said predetermined subsequent event includes sensing when said displacement reaches a predetermined value.

23. A method according to claim 20, wherein the application of heat energy step is first initiated in response to the pressure applied to the assemblies rising to a predetermined value.

24. A product made by the method of claim 18.

25. A product made by the method of claim 22.

26. A product made by the method of claim 23.

27. A product made by the method of claim 18, wherein said fusing surfaces are positioned to fuse bobbin terminal portions that extend generally away from each other.

28. A product made by the method of claim 27 wherein, each wire end lies along the respective terminal portion.

29. A product made by the method of claim 27 wherein, each wire end is wrapped around the respective terminal portion.

\* \* \* \* \*